(12) United States Patent
Kochanski et al.

(10) Patent No.: US 10,302,107 B2
(45) Date of Patent: May 28, 2019

(54) FASTENING SYSTEM AND METHOD USING A COMPRESSIBLE SLEEVE

(71) Applicant: Ford Motor Company, Dearborn, MI (US)

(72) Inventors: Kevin Joseph Kochanski, Oxford, MI (US); Sarah Kathryn Sayuri Kawai, Lasalle (CA); David Robert Shelley, Farmington, MI (US)

(73) Assignee: Ford Motor Company, Dearborn, MI (US)

( * ) Notice: Subject to any disclaimer, the term of this patent is extended or adjusted under 35 U.S.C. 154(b) by 293 days.

(21) Appl. No.: 15/200,685

(22) Filed: Jul. 1, 2016

(65) Prior Publication Data

US 2018/0003203 A1     Jan. 4, 2018

(51) Int. Cl.
  *F16B 5/02*       (2006.01)
  *F16B 43/00*     (2006.01)
  *F02M 55/02*    (2006.01)
  *F02M 61/14*    (2006.01)

(52) U.S. Cl.
  CPC ......... *F16B 5/0258* (2013.01); *F02M 55/025* (2013.01); *F02M 61/14* (2013.01); *F16B 5/025* (2013.01); *F16B 43/00* (2013.01); *F02M 2200/857* (2013.01)

(58) Field of Classification Search
  CPC ...... F16B 5/0258; F16B 5/0241; F16B 5/025; F16B 29/00; F16B 43/00; Y10T 403/52; F02M 2200/857
  See application file for complete search history.

(56) References Cited

U.S. PATENT DOCUMENTS

| 2,862,040 | A |   | 11/1958 | Curran |            |
|-----------|---|---|---------|--------|------------|
| 4,213,675 | A |   | 7/1980  | Pilhall |           |
| 4,309,123 | A | * | 1/1982  | Moore  | B25B 15/02 |
|           |   |   |         |        | 29/240     |
| 4,561,796 | A | * | 12/1985 | Hanaoka | F02P 5/02 |
|           |   |   |         |        | 403/4      |

(Continued)

FOREIGN PATENT DOCUMENTS

| GB | 837414 A      | * | 6/1960 | ............... E01B 9/16 |
| JP | 2005090530 A  | * | 4/2005 |                           |

*Primary Examiner* — Jonathan P Masinick
(74) *Attorney, Agent, or Firm* — Carlson, Gaskey & Olds, P.C.

(57) ABSTRACT

An exemplary fastening system includes, among other things, a first component providing a first aperture, a second component providing a second aperture, and a fastener. The fastener has a shaft extending from a head. The shaft extends along an axis through the first aperture and the second aperture to clamp the first component axially between the head and the second component. A compressible sleeve distributed about the shaft is compressed radially by the first component. An exemplary fastening method includes moving a shaft of a fastener along an axis through an first aperture in a first component into a second aperture in a second component, and compressing at least a portion of compressible sleeve radially with the first component. The compressible sleeve is distributed about the shaft. The method further includes clamping the first component between a head of the fastener and the second component.

17 Claims, 6 Drawing Sheets

(56) References Cited

U.S. PATENT DOCUMENTS

| | | | | |
|---|---|---|---|---|
| 4,613,000 A * | 9/1986 | Moore | B25B 15/02 173/13 |
| 5,141,357 A * | 8/1992 | Sherman | F16B 5/025 403/4 |
| 5,584,628 A * | 12/1996 | Bernoni | B60B 3/145 301/35.622 |
| 5,711,581 A * | 1/1998 | Plumer | B60B 3/02 301/35.632 |
| 5,888,012 A * | 3/1999 | Nygren, Jr. | F16B 5/0225 403/13 |
| 6,101,674 A * | 8/2000 | Furuya | B60R 16/0222 16/2.1 |
| 6,499,224 B1 * | 12/2002 | Asick | B23B 47/287 144/253.1 |
| 7,455,471 B2 * | 11/2008 | Gawehn | F16B 5/025 16/2.1 |
| 8,307,809 B2 * | 11/2012 | Hay | F02M 55/025 123/198 E |
| 8,353,227 B2 * | 1/2013 | Hayashi | B62K 21/14 74/551.1 |
| 8,875,681 B2 * | 11/2014 | Kannan | F02M 61/168 123/456 |
| 8,939,694 B2 * | 1/2015 | Weiss | B60B 3/142 411/147 |
| 2010/0202856 A1 * | 8/2010 | Donovan | F16B 5/0208 411/546 |
| 2015/0016918 A1 | 1/2015 | Colombo | |

\* cited by examiner

FASTENING SYSTEM AND METHOD USING A COMPRESSIBLE SLEEVE

TECHNICAL FIELD

This disclosure relates generally to a fastening system and, more particularly, to a fastening system incorporating a compressible sleeve.

BACKGROUND

A fastener can be used to secure a first component to a second component. A typical fastener includes a shaft extending from a head that is enlarged relative to the shaft. During assembly, the shaft can be received within an aperture of the first component and an aperture of the second component. The fastener can threadably engage the second component. The first component is clamped between the head of the fastener and the second component.

To accommodate manufacturing variations, component tolerances, and facilitate assembly, the aperture of the first component can be oversized relative to the shaft. The oversizing can complicate aligning the fastener with the second component during assembly. Some fasteners incorporate alignment systems to address misalignment.

SUMMARY

A fastening system according to an exemplary embodiment of the present disclosure includes, among other things, a first component providing a first aperture, a second component providing a second aperture, and a fastener. The fastener has a shaft extending from a head. The shaft extends along an axis through the first aperture and the second aperture to clamp the first component axially between the head and the second component. A compressible sleeve distributed about the shaft is compressed radially by the first component.

In a further non-limiting embodiment of the foregoing system, the compressible sleeve includes a bore that receives a portion of the shaft. The bore tapers downward from a first end adjacent the head to a second end that is opposite the first end.

In a further non-limiting embodiment of any of the foregoing systems, the compressible sleeve has an outer diameter at a first end adjacent the head that is larger than an outer diameter at an opposing, second end such that the compressible sleeve tapers downward from the first end to the second end.

In a further non-limiting embodiment of any of the foregoing systems, the compressible sleeve is axially spaced from the second component.

In a further non-limiting embodiment of any of the foregoing systems, the first component is a fuel rail bracket and the second component is a cylinder head.

In a further non-limiting embodiment of any of the foregoing systems, the fastener threadably engages the second component.

In a further non-limiting embodiment of any of the foregoing systems, a washer is clamped between the head and the first component.

In a further non-limiting embodiment of any of the foregoing systems, the first aperture has a perimeter. A first portion of the perimeter is provided by a bracket, and a second portion of the perimeter is open.

In a further non-limiting embodiment of any of the foregoing systems, the head extends radially past the compressible sleeve.

In a further non-limiting embodiment of any of the foregoing systems, the compressible sleeve comprises protrusions on a radially outer surface. The protrusions are circumferentially distributed about the axis.

In a further non-limiting embodiment of any of the foregoing systems, the compressible sleeve comprises protrusions on a radially inner surface. The protrusions are circumferentially distributed about the axis.

A fastening method according to another exemplary embodiment of the present disclosure includes, among other things, moving a shaft of a fastener along an axis through a first aperture in a first component into a second aperture in a second component, and compressing at least a portion of compressible sleeve radially with the first component. The compressible sleeve is distributed about the shaft. The method further includes clamping the first component between a head of the fastener and the second component.

In a further non-limiting embodiment of the foregoing method, the portion of the compressible sleeve has a diameter prior to the compressing that is greater than a diameter of the first aperture such that positioning the compressible sleeve within the first aperture causes the compressing.

In a further non-limiting embodiment of any of the foregoing methods, the portion of the compressible sleeve is placed in the first aperture during the moving.

A further non-limiting embodiment of any of the foregoing methods includes receiving the shaft within a bore of the compressible sleeve. The bore tapers downward from a first end of the compressible sleeve adjacent the head to a second end of the compressible sleeve that is opposite the first end.

In a further non-limiting embodiment of any of the foregoing methods, the compressible sleeve is axially spaced from the second component during the clamping.

A further non-limiting embodiment of any of the foregoing methods includes clamping a washer between the head and the first component.

A further non-limiting embodiment of any of the foregoing methods includes securing a fuel rail to a cylinder head during the clamping.

A further non-limiting embodiment of any of the foregoing methods includes threadably engaging the second component with the shaft during the clamping.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a fastening system. More specifically, the disclosure relates to a fastener system incorporating a compressible sleeve that can accommodate misalignment between portions of the fastening system.

Referring to FIGS. 1-5, a plurality of fastening systems 10 secure a fuel rail 14 to a cylinder head portion 18 of an engine block 22. The fuel rail 14 includes a rail body 26 and a plurality of mounting brackets 30 providing mounting bracket apertures 34.

The fastening systems 10 each include a fastener assembly 38 extends through each of the mounting bracket apertures 34 to engage a respective one of a plurality of cylinder head apertures 42 provided in the cylinder head portion 18. The fastener assemblies 38 engage the cylinder head portion 18 to secure the fuel rail 14. Six fastener assemblies 38 are used to secure the fuel rail 14 in this example.

In this example, the mounting bracket 30 can be considered a first component, and the cylinder head portion can be considered a second component. The fastener assembly 38 clamps the first component against the second component to secure the first component relative to the second component.

Although the example embodiment of the fastening system 10 is described in connection with the fuel rail 14 and cylinder head portion 18, the fastener assembly 38 could be used to secure various other components. That is, the fastener assembly 38 of the present disclosure is not limited to the securing of the fuel rail 14 to the cylinder head portion 18.

Figures 1, 2:
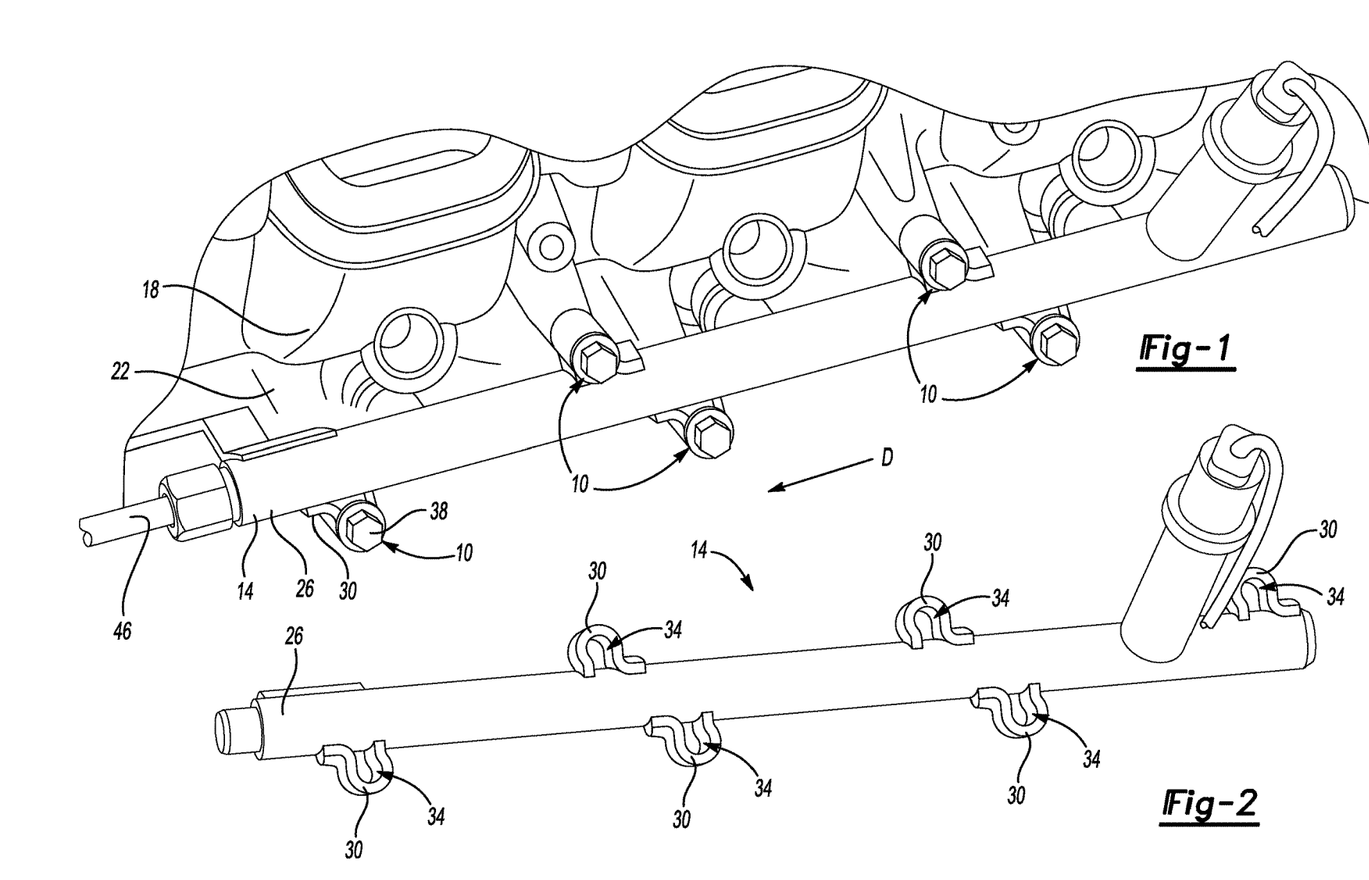
FIG. 1 illustrates a perspective view of an example fuel rail secured to a cylinder head.
FIG. 2 illustrates a perspective view of the fuel rail of FIG. 1.
Figure 3:
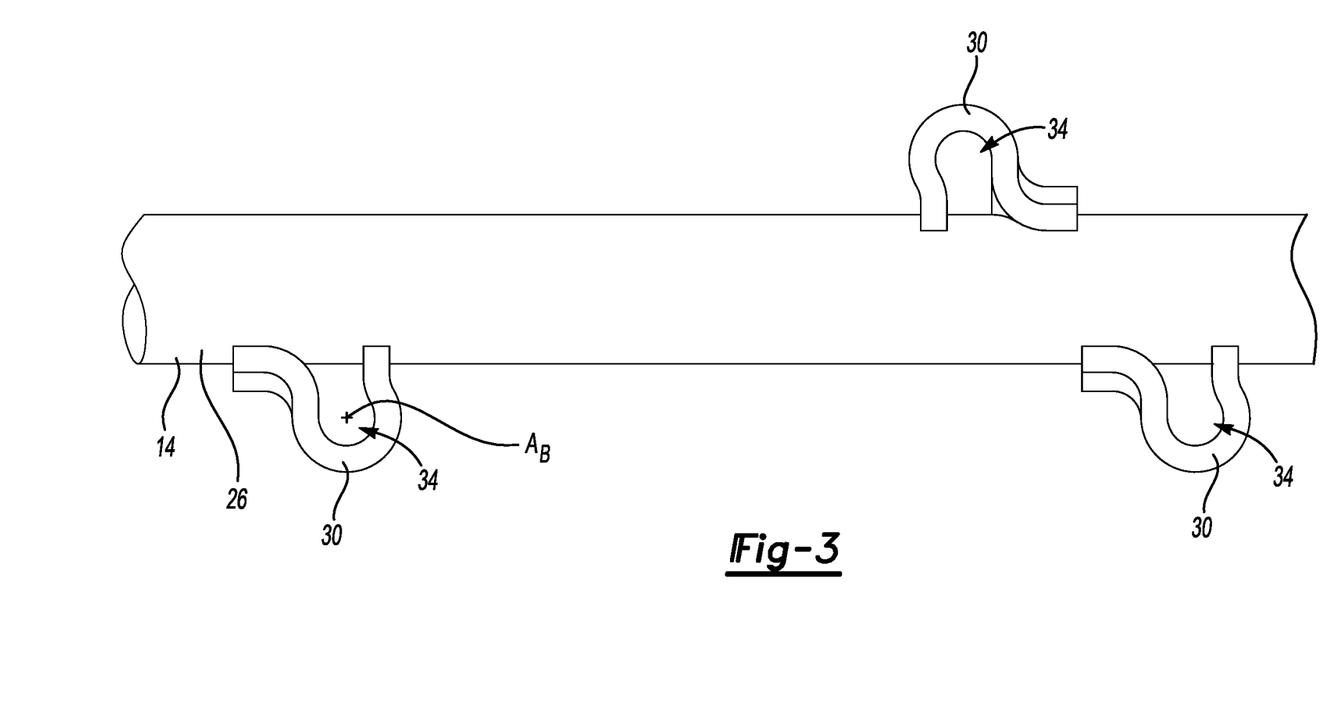
FIG. 3 illustrates a side view of the fuel rail of FIG. 1.
Figure 4:
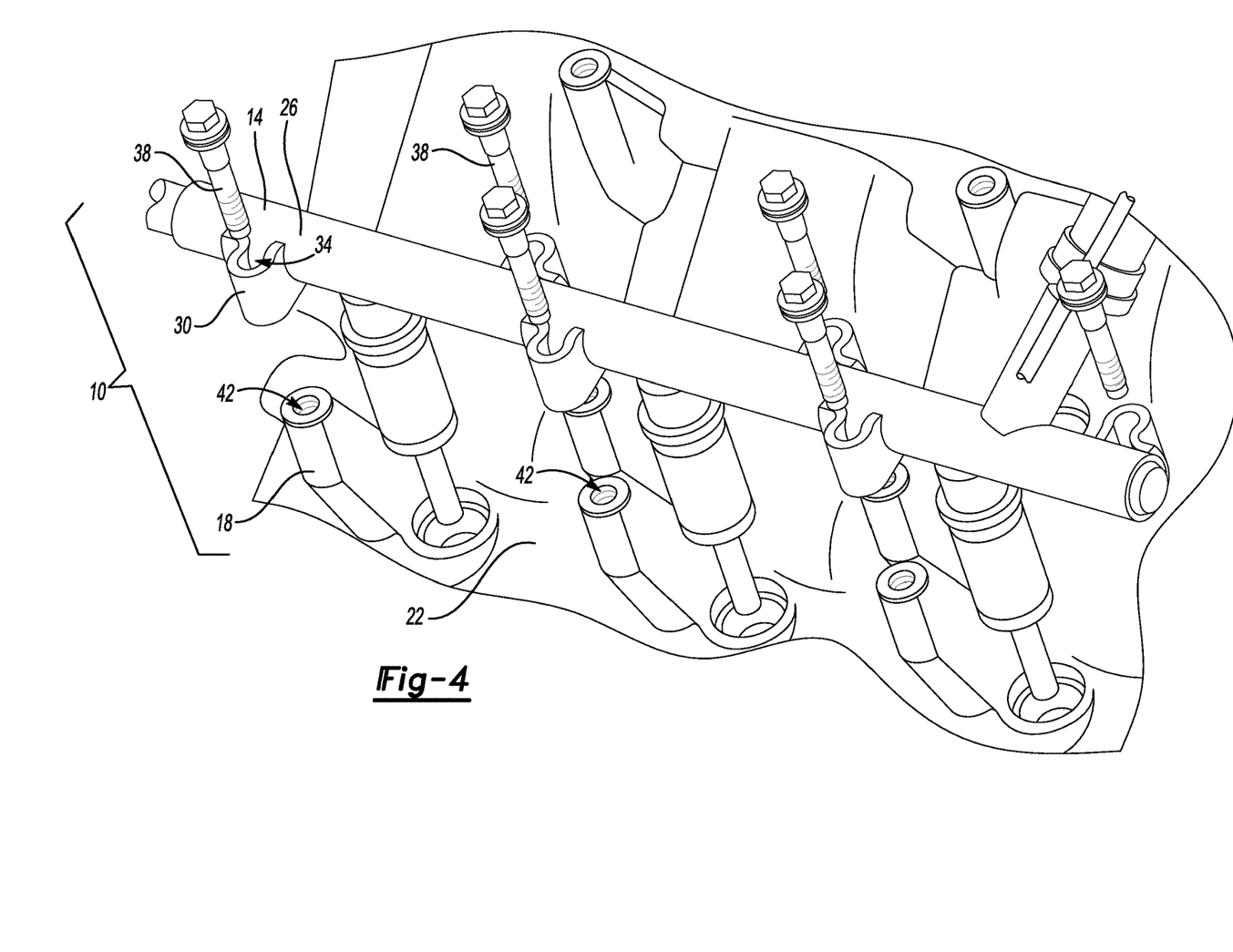
FIG. 4 illustrates a partially exploded view of the fuel rail and cylinder head of FIG. 1.

In this example, the rail body 26 and the mounting brackets 30 comprise a metallic material. The rail body 26 and mounting brackets 30 could be steel, for example. The example mounting brackets 30 are stamped, and then secured to the rail body 26 via brazing. In another example, the mounting brackets 30 are welded to the rail body 26. If the fastener assemblies 38 apply a substantially uneven load to the mounting brackets 30, the mounting brackets 30 could detach from the rail body 26.

The mounting bracket apertures 34 each have a perimeter $P_B$ (FIG. 5) distributed about a mounting bracket axis $A_B$. A portion of the perimeter $P_B$ is provided by the respective mounting bracket 30, and another portion of the perimeter $P_B$ is open to the fuel rail 14. In this example, each of the mounting brackets 30 provides about 210 degrees of the perimeter $P_B$, and the remaining portions of the perimeter $P_B$ are open. In another example, the mounting brackets 30 provide from 180 to 360 degrees of the perimeter $P_B$.

Figure 5:
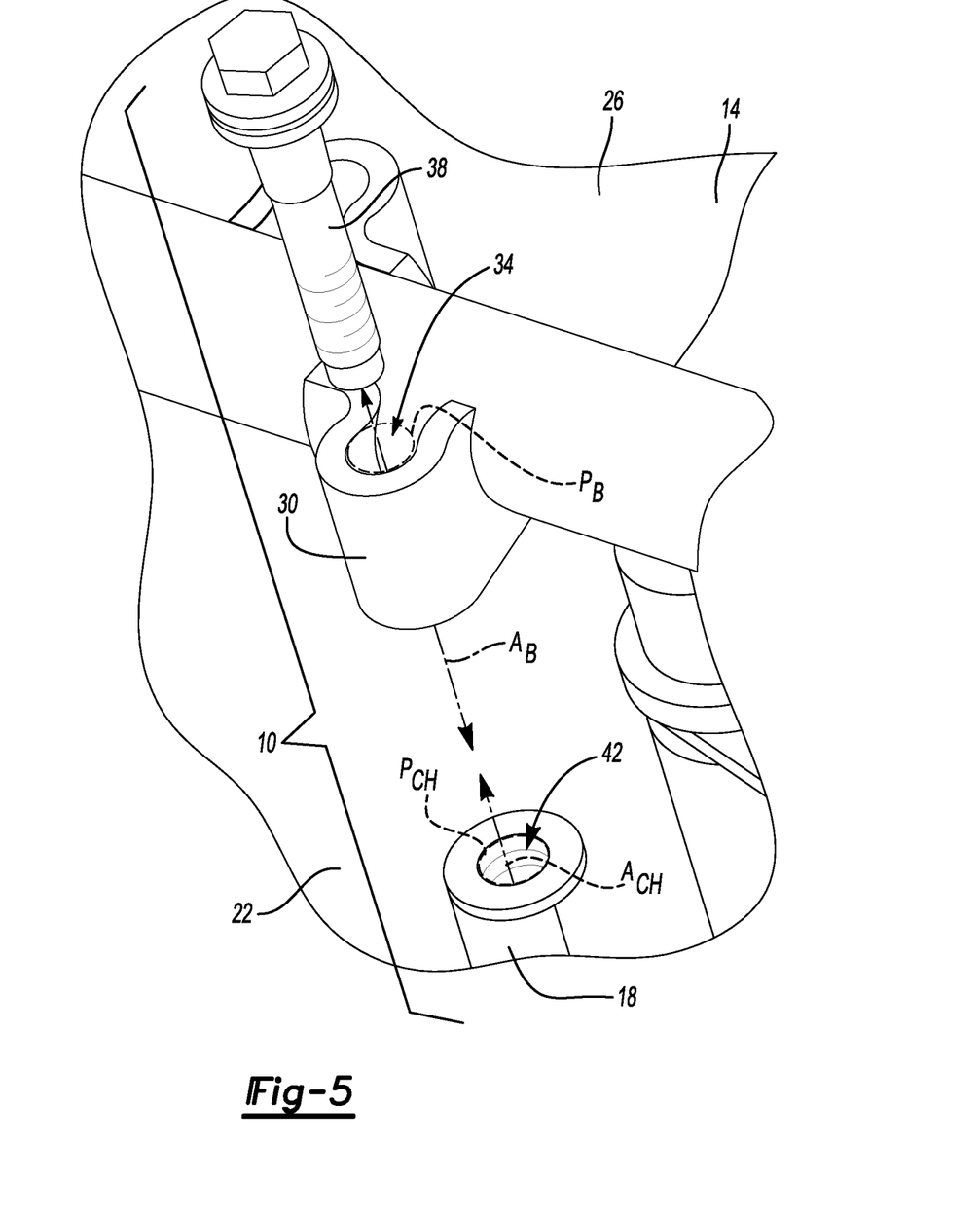
FIG. 5 illustrates a close-up view of an area of FIG. 4 showing a fastening system.

The cylinder head apertures 42 each have a perimeter $P_{CH}$ distributed about a cylinder head axis $A_{CH}$ (FIG. 5). The example cylinder head portion 18 provides the entirety of the perimeter $P_{CH}$. In another example, the cylinder head portion 18 provides a portion of the perimeter $P_{CH}$. In such an example, another structure could provide the remaining portion of the perimeter $P_{CH}$, or the remaining portion could be left open.

By design, the mounting brackets 30 are positioned along the rail body 26 such that each mounting bracket axis $A_B$ generally aligns with the respective cylinder head axis $A_{CH}$. Although coaxial alignment of the mounting bracket axis $A_B$ and the cylinder head axis $A_{CH}$ is typically desired, manufacturing variations and other variables can cause result in misalignment between the mounting bracket axis $A_B$ and the cylinder head axis $A_{CH}$.

For example, one or more of the mounting brackets 30 could be misaligned such that the mounting bracket axes $A_B$ of those mounting brackets 30 is shifted in a direction D (FIG. 1) relative to the respective cylinder head aperture 42 and cylinder head axis $A_C$. Within the fuel rail 14, some of the mounting brackets 30 could be shifted in the direction D, some of the mounting brackets 30 could be shifted in another direction, and some of the mounting brackets 30 could have their mounting bracket axis $A_B$ coaxially aligned with the respective cylinder head axis $A_{CH}$.

To address misalignment, some designs have incorporated shouldered bolts. These prior attempts to address misalignment can result in, among other things, uneven loading on the mounting brackets 30 when the fastener assemblies 38 are securing the fuel rail 14. Misalignment could complicate securing other components to the fuel rail, such as a fuel rail crossover 46 (FIG. 1). Uneven loading can, as previously mentioned, disrupt the attachment of the mounting brackets 30 to the rail body 26.

The example fastener assembly 38 can accommodate misalignment between the cylinder head axis $A_{CH}$ and the mounting bracket axis $A_B$. By accommodating such misalignment without using, for example, a shoulder bolt, loading on the mounting brackets 30 can be more evenly distributed.

Referring now to FIGS. 6-9 with continuing reference to FIGS. 1 and 2, the example fastener assembly 38 includes a fastener 50, a washer 54, and a compressible sleeve 58. The fastener 50 is a threaded fastener in this example, and includes a shaft 62 extending from a head 66 along a shaft axis $A_S$. The head 66 is enlarged radially relative to the shaft 62 and the compressible sleeve 58. The shaft 62 includes a threaded portion 70.

To secure the fuel rail 14, the shaft 62 extends through an aperture 74 in the washer 54 and a bore 78 in the compressible sleeve 58. The compressible sleeve 58 is distributed about the shaft 62 when the fastener 50 is engaging the cylinder head portion 18. The compressible sleeve 58 is made of a material that is less rigid than the mounting bracket 30 and the fastener 50. In this example, the compressible sleeve 58 is made of a nylon-based material.

Figure 6:
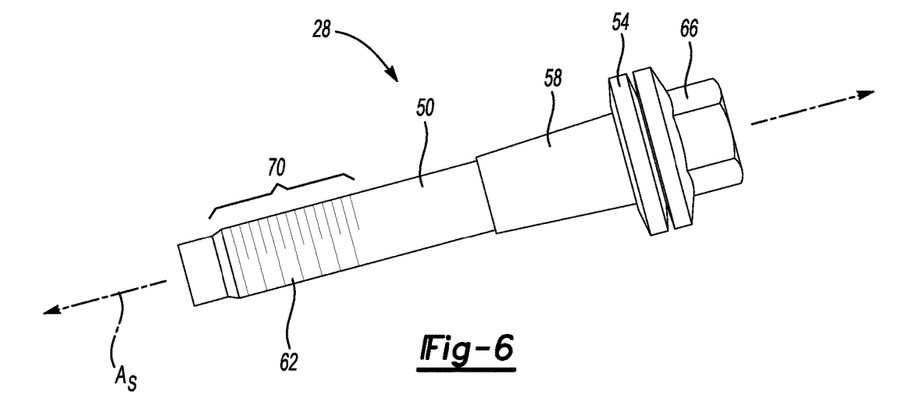
FIG. 6 illustrates a side view of a fastener assembly used to secure the fuel rail and the cylinder head of FIG. 1.
Figure 7:
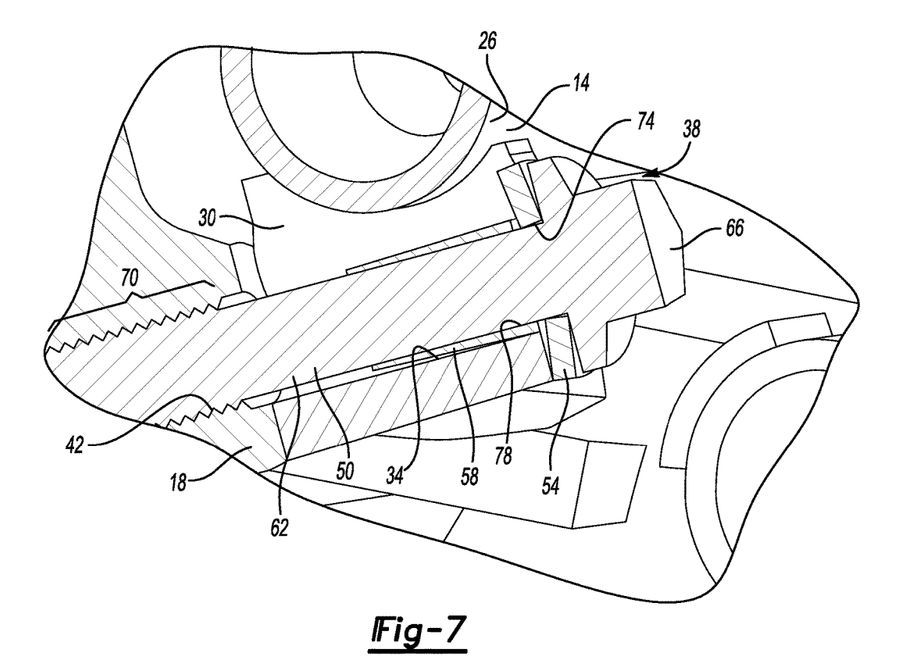
FIG. 7 illustrates a section view of the fastener assembly of FIG. 6 in a position securing the fuel rail and the cylinder head of FIG. 1.

In one non-limiting embodiment, the shaft 62 is positioned within the aperture 74 of the washer 54 and the bore 78 of the compressible sleeve 58 prior to inserting the fastener assembly 38 into the mounting bracket apertures 34 and the cylinder head apertures 42. In another embodiment, the compressible sleeve 58 could be held within the mounting bracket apertures 34, and the shaft 62 then inserted into the bore 78 as the shaft 62 is inserted into the mounting bracket apertures 34.

Figure 8:
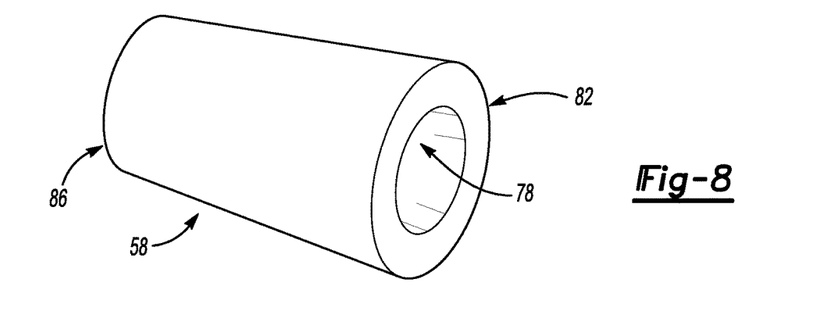
FIG. 8 illustrates a perspective view of an example compressible sleeve of the fastener assembly of FIG. 6.
Figures 9, 10:
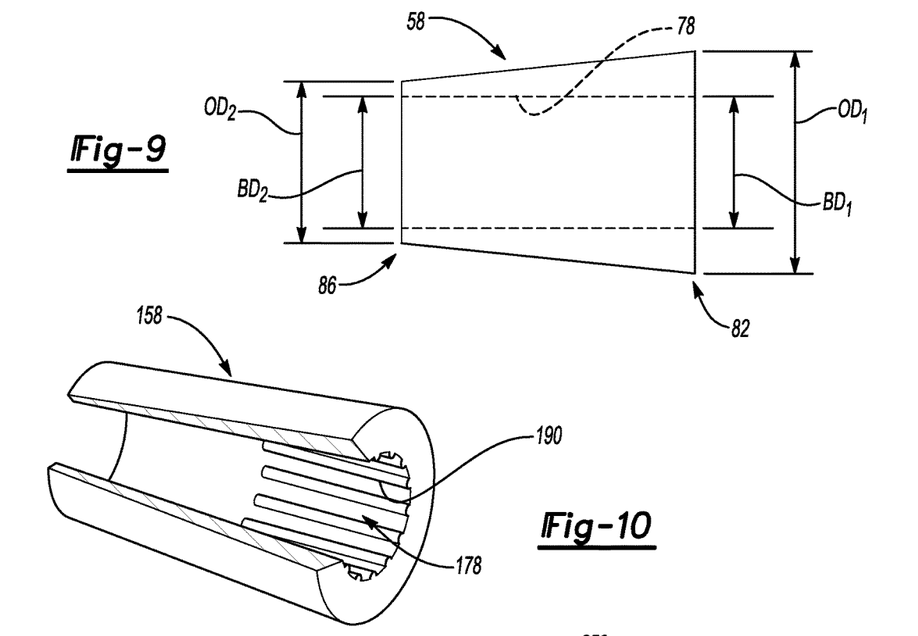
FIG. 9 illustrates a side view of the compressible sleeve of FIG. 8.
FIG. 10 illustrates a perspective view of another example compressible sleeve for use in the fastener assembly of FIG. 6.

The bore 78 extends from a first end 82 of the compressible sleeve 58 to an opposing, second end 86 of the compressible sleeve 58. At the first end 82, a bore diameter $BD_1$ is larger than a bore diameter $BD_2$ of the bore 78 at the second end 86. The bore 78 thus tapers downwardly from the first end 82 near the head 66 to the second end 86. The tapering of the bore 78 can facilitate inserting the shaft 62 into the bore 78.

At the first end 82, an outer diameter $OD_1$ of the compressible sleeve 58 is larger than an outer diameter $OD_2$ of the compressible sleeve 58 at the second end 86. The compressible sleeve 58 thus tapers downwardly from the first end 82 to the second end 86. The tapering of the compressible sleeve 58 can facilitate inserting the compressible sleeve 58 into the mounting bracket apertures 34.

When securing the fuel rail 14 to cylinder head portion 18, the fastener assemblies 38 are positioned such that each shaft 62 extends through one of the mounting bracket apertures 34 and the threaded portion 70 is near the cylinder head apertures 42. The heads 66 are then rotated so that the threaded portion 70 can threadably engage with one of the cylinder head apertures 42. The heads 66 can be rotated at the same time, or can be rotated sequentially. The washer 54 can ensure that, for example, burrs do not interfere with rotations of the head 66 or impart significant point loads on the head 66.

After sufficient rotation of the heads 66, the threaded portion 70 of the shaft 62 is fully seated within the cylinder head aperture 42, and the mounting bracket 30 is clamped axially between the washer 54 and the cylinder head portion 18.

In the example embodiment, the compressible sleeve 58 is axially shorter than an axial length of the mounting bracket aperture 34. Further, when the fastener 50 is fully seated, the compressible sleeve 58 is axially spaced from the cylinder head portion 18 such that the mounting bracket 30 can directly contact the cylinder head portion 18. Axially spacing the compressible sleeve 58 from the cylinder head portion 18 can help to ensure that compressible sleeve 58 does not undesirably resist axial movement of the fastener 50 toward the cylinder head portion 18 as the fastener 50 is seated, or prevent the mounting bracket 30 from moving toward the cylinder head portion 18.

Again, manufacturing tolerances, among other things, can require the perimeter $P_{MB}$ of the mounting bracket aperture 34 to be oversized relative to a diameter of the shaft 62. The oversizing permits movement of the shaft 62 within the mounting bracket aperture 34 to engage the respective cylinder head aperture 42, even if the mounting bracket axis $A_B$ is offset in the direction D from the cylinder head axis $A_{CH}$. In one non-limiting embodiment, the perimeter $P_{MB}$ of the mounting bracket aperture 34 has a diameter that is about 8 millimeters, and a diameter of the shaft 62 is about 6 millimeters.

Again, the oversizing permits the shaft 62 to shift radially, if required, within the mounting bracket aperture 34 as the shaft 62 engages the cylinder head aperture 42. The compressible sleeve 58 controls the shifting so that the loading on the mounting bracket 30 is more evenly distributed when the fastener 50 is fully seated. If not for the compressible sleeve 58, the shaft 62 could rapidly shift relative to the mounting bracket 30 when the shaft 62 engages one of the cylinder head apertures 42. Such shifting could undesirably impact the fastening by, for example, permitting cross-threading. Some known attempts to address shifting have resulted in uneven clamp loads that can undesirably compromise the attachment of the mounting bracket 30 to the rail body 26.

Prior to engaging the shaft 62 into the mounting bracket aperture 34, the compressible sleeve 58 effectively centers the shaft 62 within the mounting bracket 30 such that the shaft 62 is coaxially aligned with the mounting bracket axis $A_B$.

As the fastener 50 is rotated into the cylinder head aperture 42, if the cylinder head axis $A_C$ is misaligned relative to the mounting bracket axis $A_B$, one radial side of the compressible sleeve 58 can compress more than an opposing radial side as the shaft 62.

Accordingly, after fully seating the fastener 50 the shaft 62 can then be slightly misaligned relative to the mounting bracket axis $A_B$, but the mounting bracket 30 is still tightly held.

At least the outer diameter $OD_1$ of the compressible sleeve 58 is oversized relative to the perimeter $P_{MB}$ of the mounting bracket aperture 34. Thus, inserting the compressible sleeve 58 into the mounting bracket 30 compresses at least some portions of the compressible sleeve 58 inwardly toward the shaft 62.

At least the outer diameter $OD_1$ of the compressible sleeve 58 can be sized such that, when collapsed, the compressible sleeve 58 fills the area radially between the shaft 62 and the mounting bracket 30. In this example, the compressible sleeve 58 fills the gap between the shaft 62 and the mounting bracket 30 within portions of the mounting bracket aperture 34 closest to the washer 54 and the head 66 of the fastener 50.

Referring to FIG. 10 with continuing reference to FIGS. 6 and 7, another example compressible sleeve 158 can include protrusions 190 into a bore 178. When the compressible sleeve 158 receives the shaft 62, the protrusions 190 extend radially toward the shaft 62. The protrusions 190 are distributed circumferentially about an axis of the compressible sleeve 158.

The example protrusions 190 extend axially along a portion of the bore 178 in another example, the protrusions 190 extend axially along the entire bore 178.

The protrusions 190 can compress when the shaft 62 is received within the bore 178. The protrusions 190 can facilitate positioning the compressible sleeve 158 on the shaft 62 due to, for example, reduced contact area between the compressible sleeve 158 and the shaft 62.

In another example, the protrusions 190 are instead, or additionally, the result of slits cut or formed into the compressible sleeve 158. Incorporating the slits reduces contact area between the compressible sleeve 158 and the shaft 62 to facilitate positioning the compressible sleeve 158 on the shaft 62. In such an example, the portions of the compressible sleeve 158 without the slits would protrude from the portions with the slits.

Figure 11:
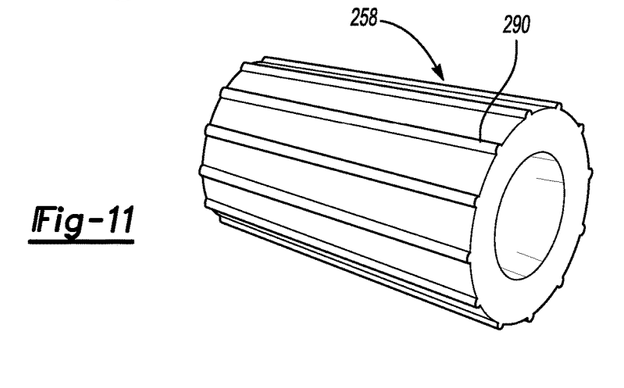
FIG. 11 illustrates a perspective view of another example compressible sleeve for use in the fastener assembly of FIG. 6.

Referring now to FIG. 11 with continuing reference to FIGS. 6 and 7, another example compressible sleeve 258 can include protrusions 290 on an outer surface of the compressible sleeve 258. When the compressible sleeve 258 receives the shaft 62, the protrusions 290 extend radially away from the shaft 62. The protrusions 290 are distributed circumferentially about an axis of the compressible sleeve 258.

The protrusions 290 extend axially along the entire compressible sleeve 258. In another example, the protrusions 290 extend axially along a portion of the compressible sleeve 258.

The protrusions 290 compress when the compressible sleeve 258 is positioned within the mounting bracket aperture 34. The protrusions 290 can facilitate positioning the compressible sleeve 258 within the mounting bracket aperture 34 due to, for example, reduced contact area between the compressible sleeve 158 and the mounting bracket 30.

In another example, the protrusions 290 are instead, or additionally, the result of slits cut or formed into the compressible sleeve 158. Incorporating the slits reduces contact area between the compressible sleeve 158 and the mounting bracket 30 to facilitate positioning the compressible sleeve 158 within the mounting bracket aperture 34. In such an example, the portions of the compressible sleeve 258 without the slits would protrude from the portions with the slits.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A fastening system, comprising:
a first component providing a first aperture;
a second component providing a second aperture;
a fastener having a shaft extending from a head, the shaft extending along an axis through the first aperture and the second aperture to clamp the first component axially between the head and the second component; and
a compressible sleeve distributed about the shaft and compressed radially within the first aperture between the first component and the shaft, the compressible sleeve including a tapered area disposed within the first aperture,
wherein the compressible sleeve comprises a plurality of protrusions distributed about the axis, each protrusion extending longitudinally from a first end portion to a second end portion, the first end portion closer to the head than the second end portion.

2. The system of claim 1, wherein the compressible sleeve includes a bore that receives a portion of the shaft, the bore tapering downward from a first end adjacent the head to a second end that is opposite the first end.

3. The system of claim 1, wherein the compressible sleeve has an outer diameter at a first end adjacent the head that is larger than an outer diameter at an opposing, second end such that the compressible sleeve tapers downward from the first end to the second end.

4. The system of claim 1, wherein the compressible sleeve is axially spaced from the second component, and the compressible sleeve is contained entirely within the first aperture.

5. The system of claim 1, wherein the first component is a fuel rail bracket and the second component is a cylinder head.

6. The system of claim 1, wherein the fastener threadably engages the second component.

7. The system of claim 1, further comprising a washer clamped between the head and the first component.

8. The system of claim 1, wherein the first aperture has a perimeter, a first portion of the perimeter is provided by a bracket and a second portion of the perimeter is open.

9. The system of claim 1, wherein the head extends radially past all portions of the compressible sleeve.

10. The system of claim 1, wherein the compressible sleeve comprises the plurality of protrusions on a radially outer surface.

11. The system of claim 1, wherein the compressible sleeve comprises the plurality of protrusions on a radially inner surface.

12. The system of claim 1, wherein each portion of the compressible sleeve is received within the first aperture such that the compressible sleeve terminates prior to extending axially outside the first aperture.

13. The system of claim 1, wherein a first radial side of the compressible sleeve is compressed more than an opposing, second radial side.

14. The system of claim 1, wherein the first aperture has a perimeter distributed about an axis of the first aperture, wherein the axis of the shaft is misaligned relative to the axis of the first aperture.

15. A fastening system, comprising:
a first component providing a first aperture;
a second component providing a second aperture;
a fastener having a shaft extending from a head, the shaft extending along an axis through the first aperture and the second aperture to clamp the first component axially between the head and the second component; and
a compressible sleeve distributed about the shaft and compressed radially within the first aperture between the first component and the shaft, the compressible sleeve including a tapered area disposed within the first aperture,
wherein the first aperture has a first perimeter portion provided by the first component, and a remaining, second perimeter portion that is open, the first perimeter portion greater than the second perimeter portion.

16. A fastening system, comprising:
a first component providing a first aperture;
a second component providing a second aperture;
a fastener having a shaft extending from a head, the shaft extending along an axis through the first aperture and the second aperture to clamp the first component axially between the head and the second component; and
a tapered compressible sleeve distributed about the shaft and compressed radially between the shaft and the first component,
wherein the aperture has a first perimeter portion provided by the first component, and a remaining, second perimeter portion that is open, the first perimeter portion greater than the second perimeter portion.

17. The system of claim 16, wherein the compressible sleeve comprises a plurality of protrusions distributed about the axis, each protrusion extending longitudinally from a first end portion to a second end portion, the first end portion closer to the head than the second end portion.

* * * * *